(12) United States Patent  
Yanai

(10) Patent No.: US 6,335,839 B1  
(45) Date of Patent: *Jan. 1, 2002

(54) MAGNETIC HEAD DEVICE INCLUDING A PLAYBACK HEAD AND A RECORDING HEAD MAINTAINING CONTACT WITH A FILM

(75) Inventor: Junichi Yanai, Chigasaki (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/960,205

(22) Filed: Oct. 29, 1997

(30) Foreign Application Priority Data

Oct. 30, 1996 (JP) .............................................. 8-288643

(51) Int. Cl.[7] .............................. G11B 5/633; G11B 5/48
(52) U.S. Cl. ..................... 360/3; 360/241.3; 360/241.1; 360/291; 360/251; 396/320
(58) Field of Search ................................ 360/1, 3, 109, 360/130.3, 130.31, 130.2, 130.21, 105, 2, 250, 251, 290, 291, 270, 241, 241.1, 241.3; 396/320

(56) References Cited

U.S. PATENT DOCUMENTS

| 4,628,386 A | * | 12/1986 | Chabrolle | .................. | 360/2 X |
| 5,018,034 A | * | 5/1991 | Tanaka et al. | .......... | 360/109 X |
| 5,191,198 A | * | 3/1993 | Do | ............................. | 360/2 X |
| 5,703,737 A | * | 12/1997 | Katohno et al. | ............ | 360/109 |

* cited by examiner

Primary Examiner—Andrew L. Sniezek

(57) ABSTRACT

A magnetic head device for reading and recording information from a magnetic recording section of a photographic film has a recording head and a playback head. The playback head and recording head are adjacently positioned by a head base plate. The head base plate rotatably supports the recording head and playback head as the head base plate rotates about a first rotation shaft and a second rotation shaft. The first rotation shaft extends in a direction of the film defined by movement of the film as film is wound onto a winding spool within a film cartridge. The second rotation shaft extends in a width direction of the film, perpendicular to the first rotation shaft. As a result the recording head and playback head make contact with the film to improve consistency of the playback and reading of information from the magnetic section of the film.

10 Claims, 5 Drawing Sheets

MAGNETIC HEAD DEVICE INCLUDING A PLAYBACK HEAD AND A RECORDING HEAD MAINTAINING CONTACT WITH A FILM

CROSS-REFERENCE TO RELATED APPLICATIONS

This application is based upon and claims priority of Japanese Patent Application No. 08-288643 filed Oct. 30, 1996, the contents being incorporated herein by reference.

BACKGROUND OF THE INVENTION

The present invention relates to a magnetic head device in the form of a film image input device that reads images recorded on photographic film. More particularly, the present invention relates to a magnetic head device that can record magnetic information and convert the magnetic information into image signals. The present invention also relates to a camera that takes photographs and magnetically records photographic conditions onto photographic film.

In recent years, cameras designed to use film that have a magnetic recording section, in addition to an image recording section, have been known. Viewers that convert an image on photographic film into an electrical image signal to be displayed on a cathode ray tube ("CRT") have also been known. These types of cameras and viewers read film information, such as film speed and number of photographed frames, that has been stored in the magnetic record section. These types of cameras also record photographic information, such as aperture and shutter speed, in the magnetic recording section.

FIG. 8 (prior art) is an elevated perspective view of a magnetic recording and playback head unit used in a conventional image input device. As illustrated in FIG. 8 playback head 104 and recording head 105 are adjacently fixed to head base plate 113. Head base plate 113 is energized by springs 118a and 118b to move along parallel guiding rods 114a and 114b in the direction of arrow C. A pin (not shown in FIG. 8) on head base plate 113 makes contact with an upper edge 103E of film 103 in response to an energy imparting force from springs 118a and 118b. Pin enables playback head 104 and recording head 105 to maintain a specified distance from upper edge 103E of film 103. As a result, playback head 104 and recording head 105 respectively play back and record the information on magnetic recording section 108 of film 103.

Guiding rods 114a and 114b are fixed to a base member 120. Rotation shafts 123a and 123b (only 123b is shown in FIG. 8) protrude from base member 120 almost parallel to the moving direction of film 103. Rotation shafts 123a and 123b are inserted into rotation guides 121a and 121b so that head base plate 113 rotates about rotation shafts 123a and 123b. Spring support section 115 is fixed to guiding rods 114a and 114b. Springs 116a and 116b, attached to spring support section 115, energize head base plate 113 in a downward direction toward the film 3. As a result, playback head 104 and recording head 105 are pressed against a pad (not shown in FIG. 8) by springs 116a and 116b with film 103 between the pad and heads 104 and 105. The recording head 105 and playback head 104 maintain contact with film 103 specified distance from upper edge 103E of film 3, to enable information to be recorded and played back.

In order to maximize playback and recording quality, recording head 105 and playback head 104 should both contact film 3. Typically, when manufacturing recording head 105 and playback head 104, a manufacturing error of 100 to 200 μm exists. This manufacturing error is illustrated in FIG. 5. In FIG. 5, playback head 4 is positioned on head base plate 13 adjacent to recording head 5. Playback head 4 has a height d1 from baseplate 13. Likewise, recording head 5 has a height d2 from baseplate 13. As can be seen, height d2 is greater than height d1. If heads 4 and 5 are energized against film 3 by merely applying energy directly towards film 3, recording head 5 will make contact with film 3 while playback head 4 does not. As a result, consistency of playback and recording of information is diminished.

BRIEF SUMMARY OF THE INVENTION

It is therefore an object of the present invention to provide a magnetic head device that improves consistency in recording and playing back magnetic information of a film.

It is a further object of the present invention to provide a camera that enables both a playback head and a recording head to make contact with a film when the recording head has a height that is not equal to a height of the playback head.

Objects of the invention are achieved by a magnetic head device to read and record information from a magnetic recording section of a film, including a recording head to record information from the magnetic recording section of the film; a playback head to read recorded information from the magnetic recording section of the film; a head base plate to position the recording head adjacent to the playback head; a first rotation shaft that extends in the moving direction of the film, a second rotation shaft that extends in a width direction of the film; and a support unit to rotatably support the head base plate about the first and second rotation shafts.

Further objects of the invention are achieved by a magnetic head device to read and record information from a magnetic recording section of a film, including a recording head to record information in the magnetic recording section of the film; a playback head to read information in the magnetic recording section of the film; a head base plate to position the recording head adjacent to the playback head; a first rotation shaft that extends in a width direction of the film; a pad base plate that rotates about the first rotation shaft; and a flexible pad positioned across adjacent from the recording head and the playback head by the new base plate, the film being positioned between the recording and playback heads and the flexible pad.

Even further objects of the invention are achieved by a magnetic head device to read and record information from a magnetic recording section of a film, including a recording head to record information in the magnetic recording section of the film; a playback head to read recorded information from the magnetic recording section of the film; a head base plate to position the recording head adjacent to the playback head; a first rotation shaft that extends in a moving direction of the film, a second rotation shaft that extends in a width direction of the film; a guide rod that extends in the width direction of the film to rotatably support the head base plate about the first and second rotation shafts; and a spring to impart energy toward the film to rotate the head base plate about the first and second rotation shafts.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
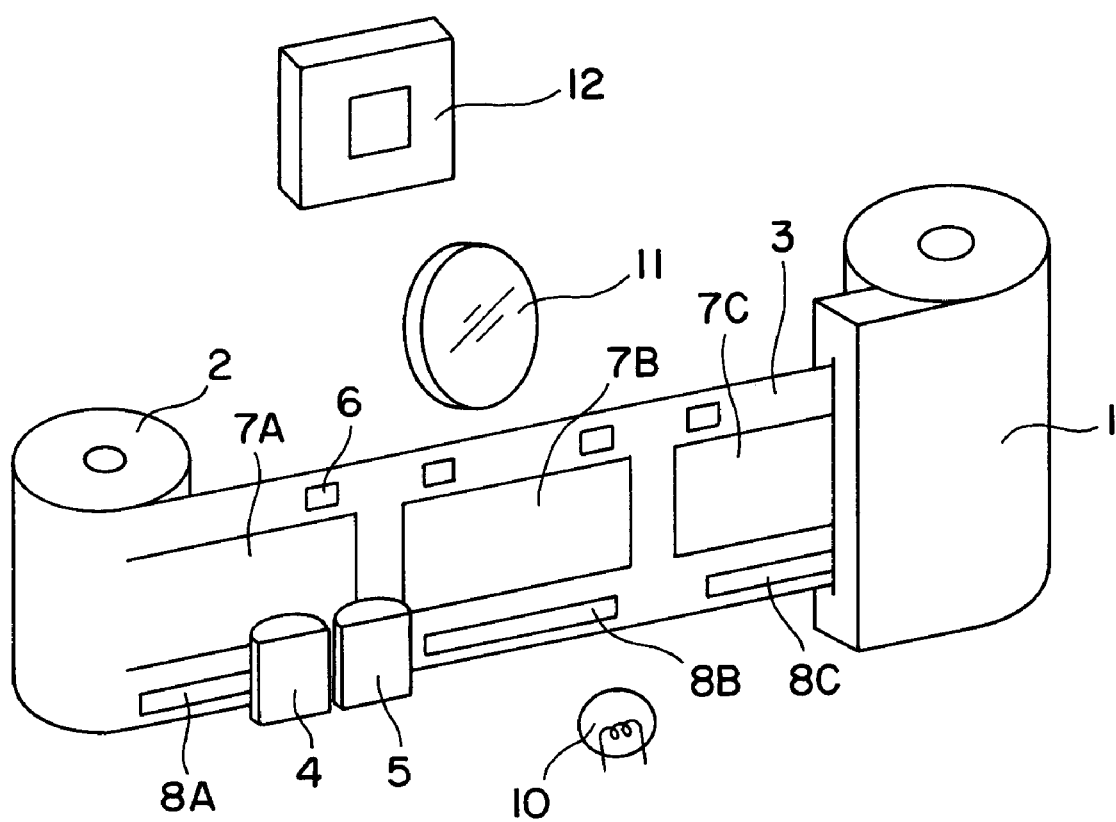
FIG. 1 is an elevated front view of a film image input device including a magnetic head unit according to a preferred embodiment of the present invention.

Reference will now be made in detail to the preferred embodiments of the present invention, examples of which are illustrated in the accompanying drawings, wherein like reference numerals refer to like elements throughout.

As illustrated in FIG. 1, a film image input device is provided, such as for a camera. Film 3 accommodated in a film cartridge 1 is wound onto a winding spool 2. Image recording sections 7A, 7B, and 7C that record the image, as well as magnetic recording sections 8A, 8B, and 8C that record magnetic data corresponding to the image, are provided on film 3. Both image recording sections 7A, 7B, and 7C and magnetic recording sections 8A, 8B, and 8C are exposed within a space created on film 3 between winding spool 2 and cartridge 1. Information recorded in magnetic recording sections 8A, 8B, and 8C is read by playback head 4. Magnetic information is recorded by recording head 5.

Illumination light source 10, imaging lens 11, and imaging element 12 are positioned over film 3 between winding spool 2 and cartridge 1. Perforations 6 are formed for verifying the number of frames of a film and for determining film position. Subsequently, with light illuminated from illumination light source 10, penetrated light expressing an image that has been recorded on film 3 goes through photographic lens 11 and forms an image on imaging element 12. Imaging element 12 outputs electrical signal according to the formed image.

Figure 2:
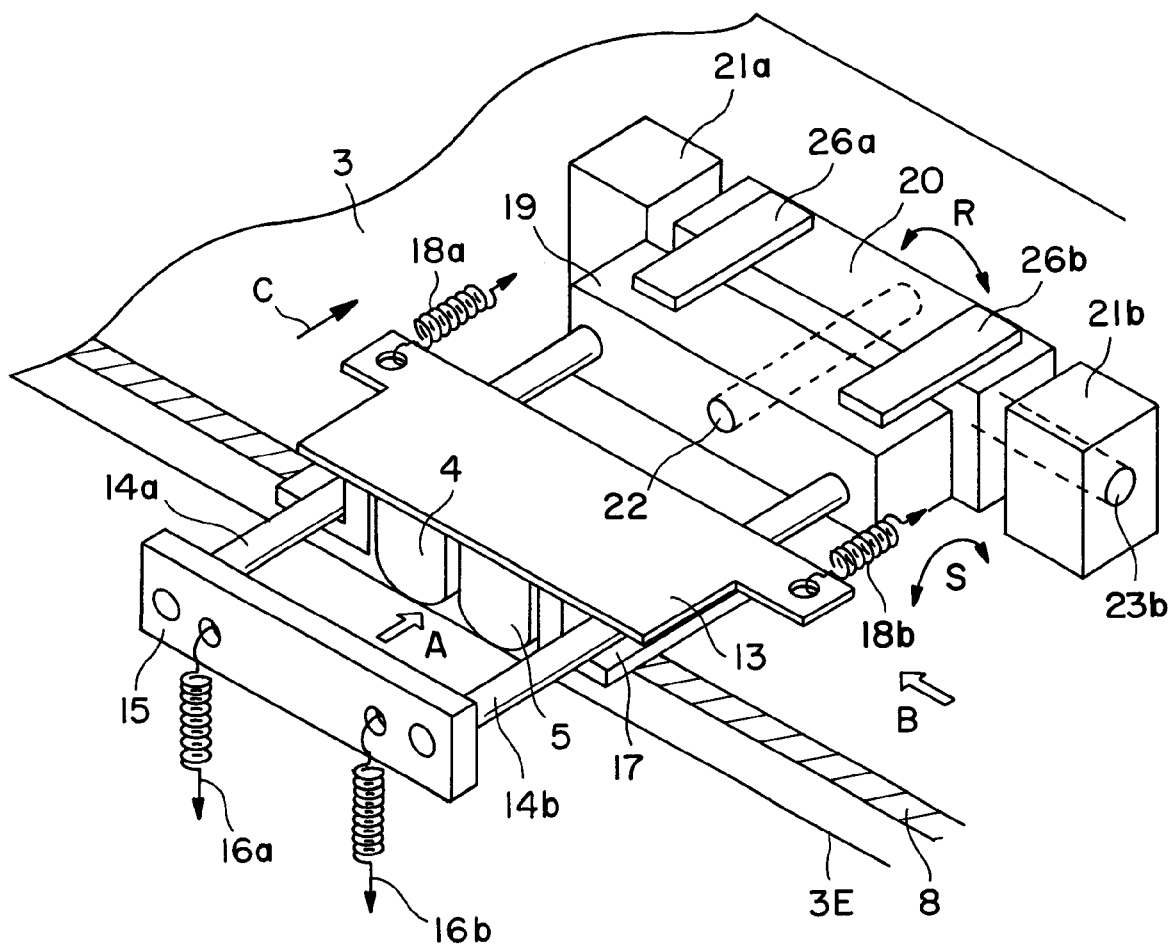
FIG. 2 is an elevated perspective view of the magnetic head unit of FIG. 1.
Figure 3:
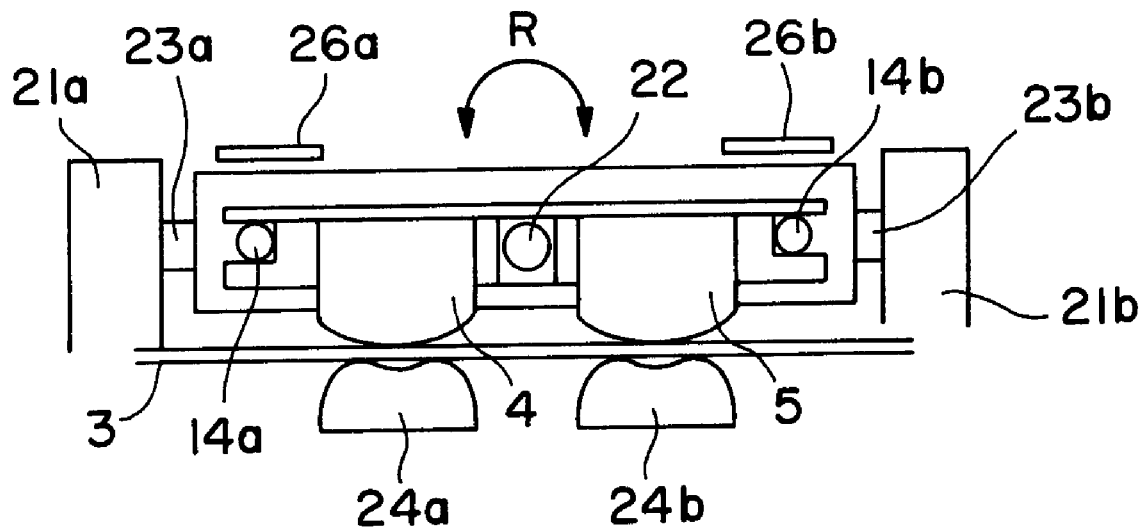
FIG. 3 is a front view of the film image input device in direction A of FIG. 2.
Figure 4:
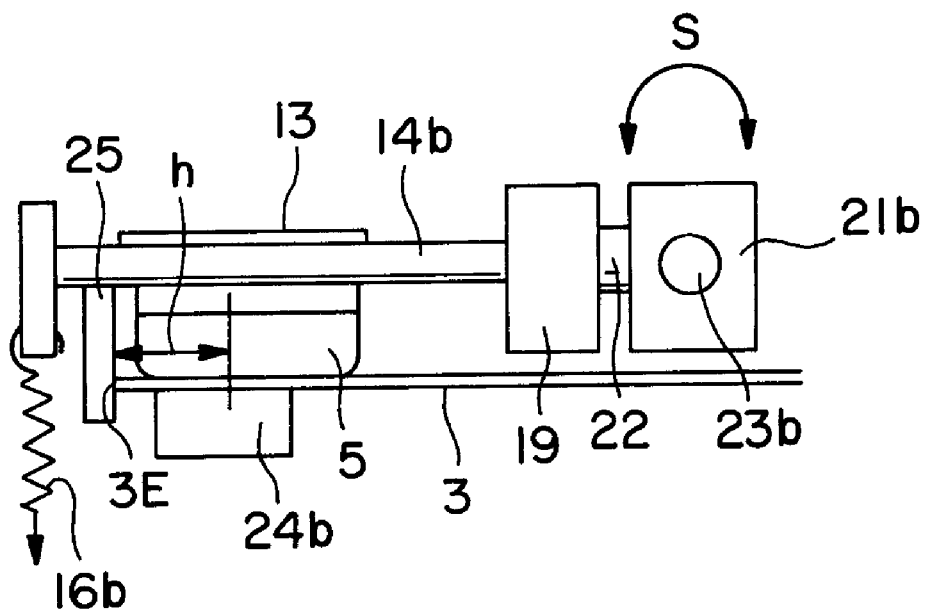
FIG. 4 is a side view of the film image input device in direction B of FIG. 2.
Figure 5:
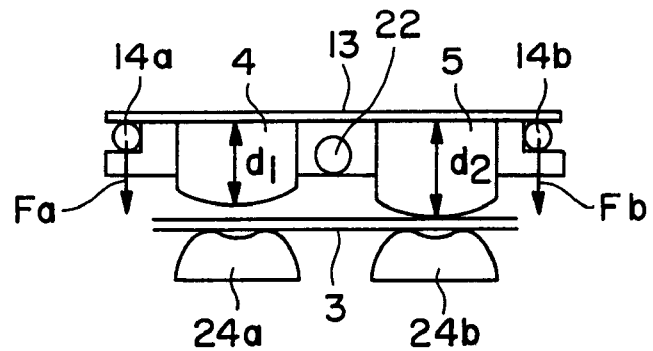
FIG. 5 is a front view of a film image input device according to a preferred embodiment of the present invention.

As illustrated in FIG. 2, playback head 4 and recording head 5 are retained, adjacent to each other, on head base plate 13. A slide support 17 is fixed to head base plate 13. Head base plate 13 is supported by and moves along two parallel guiding rods 14a and 14b positioned in slide support 17. Head base plate 13 is energized by springs 18a and 18b in a direction shown by arrow C. As illustrated in FIG. 4, energy imparting force of springs 18a and 18b cause a pin 25 on head base plate 13 to make contact with an upper edge 3E of film 3. Pin 25 enables playback head 4 and recording head 5 to maintain a specified distance h from upper edge 3E of the film. This distance h corresponds to a distance that enables playback head and recording head to make contact with a recording section 8 of the film. As a result, playback head 4 and recording head 5 record and play back, respectively, the information for magnetic recording sections 8A, 8B, and 8C of film 3.

As illustrated in FIG. 2, guiding rods 14a and 14b are fixed to a first base member 19, A rotation shaft 22 protrudes from a first base member 19 in a direction opposite to guiding rods 14a and 14b. Rotation shaft 22 is inserted in a second base member 20. Rotation control members 26a and 26b are fixed to second base member 20. As a result, both first base member 19 and head base plate 13 rotate in a direction shown by arrow R with respect to second base member 20. Rotation in the direction shown by arrow R has a center of rotation defined by rotation shaft 22. A range of rotation of head base plate 13 is limited by rotation control members 26a and 26b. Additionally, rotational shafts 23a and 23b (only 23b is illustrated in FIG. 2) protrude from second base member 20 almost parallel to the moving direction of film 3. Rotational shafts 23a and 23b are inserted in rotation guides 21a and 21b. As a result, head base plate 13 rotates in a direction illustrated by arrow S with a center of rotation defined by rotational shafts 23a and 23b.

Guiding rods 14a and 14b are fixed to a spring support section 15. As illustrated in FIG. 2, springs 16a and 16b are attached to spring support section 15. Springs 16a and 16b energize head base plate 13 towards film 3. Pads 24a and 24b are positioned below playback head 4 and recording head 5 respectively. Playback head 4 and recording head 5 are pressed against pads 24a and 24b by springs 16a and 16b. Pads 24a and 24b are made of a flexible material that deforms when pressed against playback head 4 and recording head 5. Since film 3 is positioned between playback head 4 and recording head 5, energizing force imparted by spring 16a and 16b brings playback head 4 and recording head 5 in contact with film 3. As a result, recording head 5 and playback head 4 record and play back, respectively, information while maintaining contact with film 3 at a specified distance h from upper edge 3E of the film.

Figure 6:
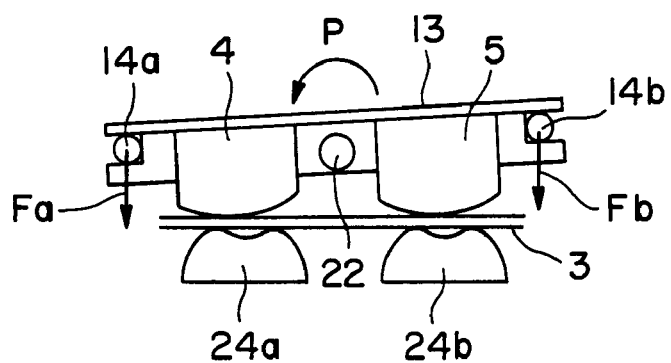
FIG. 6 is a front view of a film image input device according to a preferred embodiment of the present invention.

A film image input device having a magnetic head unit according to a preferred embodiment of the invention is illustrated in FIG. 6. If recording head 5 has a greater height than playback head 4, recording head 5 makes initial contact with film 3. As head base plate 13 rotates about rotation shaft 22, and playback head 4 is pushed towards film 3 by force Fa produced by spring 16a, head base plate rotates in a direction shown by arrow P. As a result, playback head 4 makes contact with film 3. Likewise, as recording head 5 is energized towards film 3 by force Fb produced by spring 16b and flexible pad 24b, pad 24b slightly deforms as playback head 4 touches film 3. This slight deformation of pad 24b enables recording head 5 to maintain contact with film 3. As a result, both heads 4 and 5 make contact with film 3, thereby enabling improved play back and reading of information from magnetic recording sections 8A, 8B, and 8C.

Figure 7:
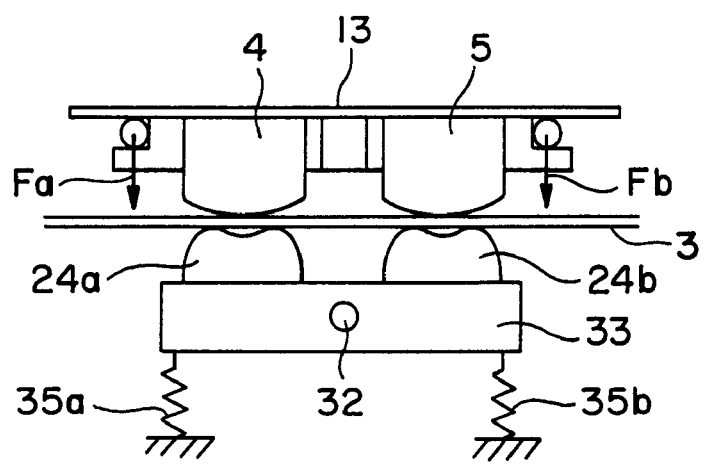
FIG. 7 is a front view of a film image input device according to a second preferred embodiment of the present invention.
Figure 8:
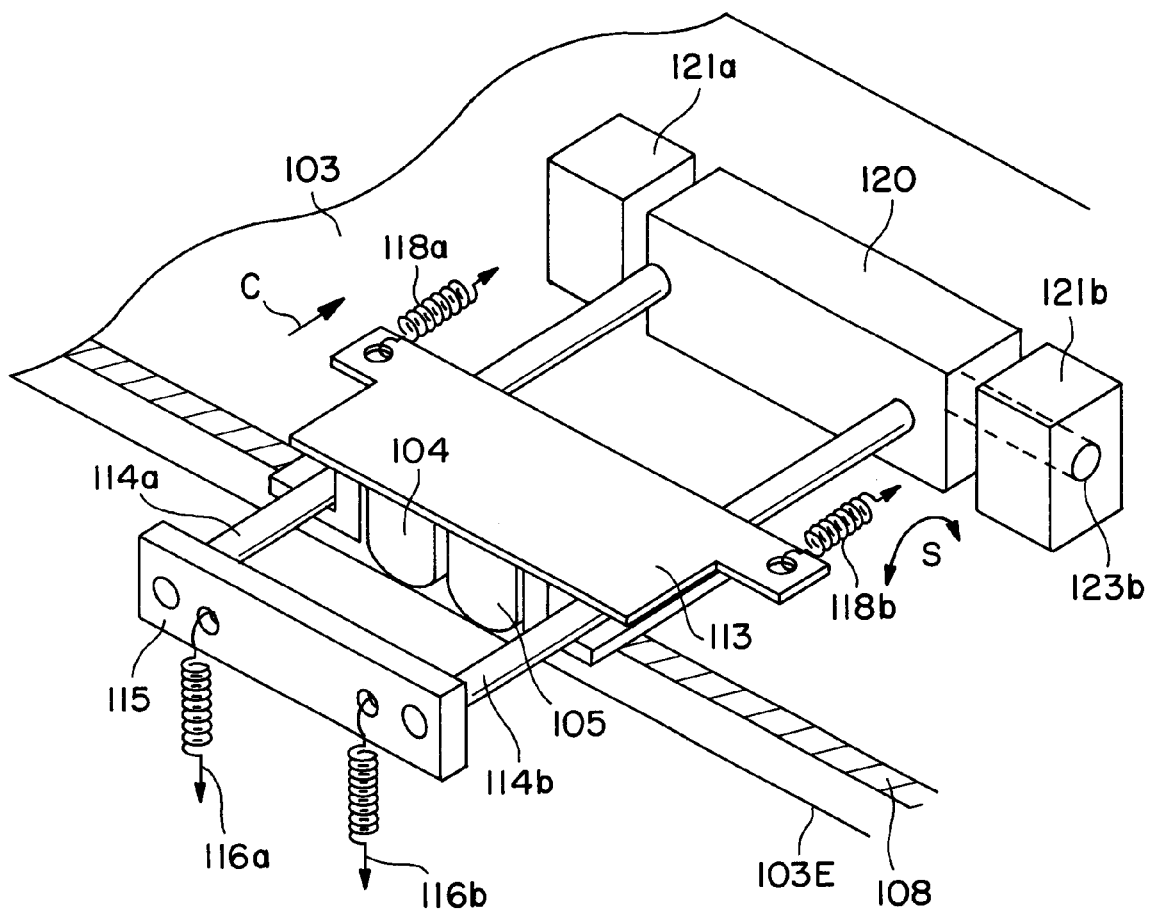
FIG. 8 (prior art) is an elevated perspective view of a conventional magnetic head unit.

FIG. 7 is a front view of a film image input device having a magnetic head unit according to a second preferred embodiment of the present invention. In FIG. 7, the same elements of the device those elements of the device of FIGS. 1 through 6 are assigned with the same numbers and a detailed explanation is omitted. In this second preferred embodiment, a pad base plate 13 is fixed to second base member 20 by guiding rods 14a and 14b. First base element 19 is eliminated. Pads 24a and 24b are fixed to a pad base plate 33. Pad base plate 33 rotates about a rotation shaft 32 that is perpendicular to the moving direction of film 3. Pad base plate 33 is energized towards film 3 by springs 35a and 35b. Since rotation shaft 32 is fixed with respect to a camera unit (not shown), a counterclockwise moment and a clockwise moment are exerted on pad base plate 33 by springs 35a and 35b, respectively.

Film 3 is positioned between pads 24a and 24b and heads 4 and 5. As noted above, if recording head 5 has a greater height than playback head 4, recording head 5 makes contact with film 3. Since head base plate 13 is energized towards film 3 and pad base plate 33 rotates about rotation shaft 32, pad 24a juxtaposed with playback head 4, rotates towards film 3 about rotation shaft 32. This rotation enables playback head 4 to make contact with film 3. In the same way, pad 24b, which is juxtaposed with recording head 5, moves away from film 3. The rotation of pad base plate 33 is directed by height difference between heads 4 and 5. Because pad base plate 33 receives both clockwise and counterclockwise moment by springs 35a and 35b, recording head 5 maintains contact with film 3. As a result, both heads 4 and 5 can make contact with film 3, thereby enabling improved consistency play back and reading of information from magnetic recording sections 8A, 8B, and 8C.

In the above-described embodiments, either head base plate 13 or pad base plate 33 rotate, or both may rotate as well. Moreover, while head base plate 13 is set at a distance and faces film 3, pad base plate 33 may be placed at a distance from the surface of film 3 instead. Furthermore, although the above described embodiments provide a magnetic head device used in a film image input device, such as a viewer, embodiments of the present invention are not so limited and may be applied to cameras, scanners and the like.

A magnetic head device reads and records information contained in a magnetic recording section or track of a film. The magnetic head device has a recording head that records information in the magnetic recording section and a playback head that reads the recorded information in the magnetic recording section. A head base plate positions the recording head adjacent to the playback head. A support unit rotatably supports the head base plate as it rotates about a first rotation shaft. The first rotation shaft extends in the moving direction of the film. The support unit also supports the head base plate as it rotates about a second rotation shaft. The second rotation shaft extends in a width direction of the film. Due to normal manufacturing error, the playback head and the recording head have different distances from the film. As the support unit rotates about first rotation shaft, the head base plate rotates to bring the playback head and the recording head towards the film. The head extending closest to the film makes initial contact with the film. As the support unit rotates about the second rotation shaft, the head farthest from the film is brought towards the film to improve consistency in recording and playing back of magnetic information with respect to the film.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A magnetic head device to read and record information from a magnetic recording section of a film, comprising:

a recording head to record information from the magnetic recording section of the film;

a playback head to read recorded information from the magnetic recording section of the film;

a head base plate to position said recording head adjacent to said playback head;

a first rotation shaft that extends in a moving direction of the film;

a second rotation shaft that extends in a width direction of the film;

a support unit to rotatably support said head base plate about said first and second rotation shafts, wherein rotation of said first and second rotation shafts maintains contact of said recording and playback heads with the film;

flexible pads positioned adjacent to said recording head and said playback head, the film being positioned between the recording and playback heads and the flexible pads;

a first energy imparting unit to rotate said head base plate about the first and second rotation shafts; and a second energy imparting unit to rotate said head base plate about the first and second rotation shafts, said recording head and said playback head being between said first energy imparting unit and said second energy imparting unit with respect to the moving direction of the film.

2. A magnetic head device as in claim 1, wherein the first energy imparting unit is a spring.

3. A magnetic head device as in claim 2, wherein the second energy imparting unit is a spring.

4. A magnetic head device as in claim 1, wherein the second energy imparting unit is a spring.

5. A magnetic head device as in claim 1, further comprising a rotation control member that extends over the support unit to limit the rotation of said head base plate about the first and second rotation shafts.

6. A magnetic head device as in claim 1, wherein the support unit further comprises a parallel guide rod extending in the width direction of the film.

7. A magnetic head device as in claim 1, further comprising a pin extending from said head base plate, the pin making contact with an upper edge of the film to maintain the recording head and the playback head at a distance from the upper edge of the film, as said head base plate moves in the width direction of the film.

8. A magnetic head device to read and record information from a magnetic recording section of a film, comprising:

a recording head to record information in the magnetic recording section of the film;

a playback head to read recorded information from the magnetic recording section of the film;

a head base plate to position said recording head adjacent to said playback head;

a first rotation shaft that extends in a moving direction of the film;

a second rotation shaft that extends in a width direction of the film;

a guide rod that extends in the width direction of the film to rotatably support the head base plate about the first and second rotation shafts;

flexible pads positioned adjacent to said recording head and said playback head, the film being positioned between the recording and playback heads and the flexible pads;

a first spring to impart energy toward the film to rotate the head base plate about the first and second rotation shafts; and a second spring to impart energy toward the film to rotate the head base plate about the first and second rotation shafts, said recording head and said playback head being between said first spring and said second spring with respect to the moving direction of the film.

9. A magnetic head device having a playback head to read information and a recording head to record information from a magnetic recording section of a film, the magnetic head device comprising:

means for supporting said playback head adjacent to said recording head; and means for rotating said playback head and recording head about a first axis and a second axis different from the first axis, wherein said rotation about the first axis and the second axis maintains contact of said recording and playback heads with the film.

10. A magnetic head device as in claim 9, wherein the first axis is substantially perpendicular to the second axis.

* * * * *